United States Patent
Haimerl et al.

(10) Patent No.: US 6,776,487 B2
(45) Date of Patent: Aug. 17, 2004

(54) PROGRESSIVE SPECTACLE LENS HAVING ONLY A SMALL CHANGE OF BINOCULAR PROPERTIES DURING A MOVEMENT OF GLANCE

(75) Inventors: Walter Haimerl, Munich (DE); Herbert Pfeiffer, Munich (DE); Gregor Esser, Munich (DE); Helmut Altheimer, Lauchdorf (DE); Andrea Welk, Munich (DE); Peter Baumbach, Munich (DE); Rainer Dorsch, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 10/281,275

(22) Filed: Oct. 28, 2002

(65) Prior Publication Data

US 2003/0142266 A1 Jul. 31, 2003

Related U.S. Application Data

(63) Continuation of application No. PCT/DE01/01592, filed on Apr. 27, 2001.

(30) Foreign Application Priority Data

Apr. 27, 2000 (DE) .......................................... 100 20 717

(51) Int. Cl.$^7$ ................................................ G02C 7/06
(52) U.S. Cl. ........................................................ 351/169
(58) Field of Search ................................ 351/168, 169, 351/171

(56) References Cited

U.S. PATENT DOCUMENTS

4,606,622 A    8/1986   Fuëter et al.
5,557,348 A  * 9/1996   Umeda et al. .............. 351/169

FOREIGN PATENT DOCUMENTS

EP              0994375           4/2000

* cited by examiner

Primary Examiner—Scott J. Sugarman
Assistant Examiner—Darryl J. Collins
(74) Attorney, Agent, or Firm—Crowell & Moring LLP

(57) ABSTRACT

A spectacle lens comprises a region (distance portion) designed for viewing at large distances and in particular "to infinity"; a region (near portion) designed for viewing at short distances and in particular "reading distances"; and a progressive zone disposed between the distance portion and the near portion, in which a power of the spectacle lens increases from a value at a distance reference point located in the distance portion to a value at a near reference point located in the near portion along a curve (principal line) veering towards a nose. The invention is distinct in that, for minimizing a change of binocular imaging properties with horizontal movements of glance, a lift (difference between a maximum and a minimum value occurring during a movement) of binocular imaging properties when a moving object is being followed, is smaller than a physiologically pre-determined limiting amount.

5 Claims, 3 Drawing Sheets

PROGRESSIVE SPECTACLE LENS HAVING ONLY A SMALL CHANGE OF BINOCULAR PROPERTIES DURING A MOVEMENT OF GLANCE

CROSS REFERENCE TO RELATED APPLICATIONS

The present application is a continuation of international patent application no. PCT/DE01/01592, filed Apr. 27, 2001, designating the United States of America, the entire disclosure of which is incorporated herein by reference. Priority is claimed based on German patent application no. 100 20 717.0, filed Apr. 27, 2000.

FIELD OF THE INVENTION

The invention relates to a progressive spectacle lens according to the preamble of patent claim 1, the lens exhibiting an only small change of binocular properties during a movement of glance.

Progressive spectacle lenses (also called varifocal lenses, multifocal lenses etc.) are usually understood to be spectacle lenses having a different (lower) power in the region through which a spectacles wearer views an object located at a great distance—hereunder referred to as a distance portion—than in the region (near portion) through which the spectacles wearer views a near object. Located between the distance portion and the near portion is the so-called progressive zone in which the power of the spectacle lens continuously increases from that of the distance portion to that of the near portion. The magnitude of the power increase is also designated as addition power (Add).

As a rule, the distance portion is located in the upper part of the spectacle lens and designed for viewing "to infinity", whilst the near portion is located in the lower region and is particularly designed for reading. In spectacles for special application—those for pilots or for monitor work stations are mentioned as examples—the distance and near portions may also be arranged differently and/or designed for other distances. Furthermore, it is possible for a plurality of near portions and/or distance portions and suitable progressive zones to be present.

With progressive spectacle lenses having a constant refractive index it is necessary, in order that the power may increase between the distance portion and the near portion, that the curvature of one or both surfaces continuously change from the distance portion to the near portion.

The surfaces of spectacle lenses are usually characterized by the so-called principal radii of curvature R1 and R2 at every point on the surface. (Sometimes also the so-called principal curvatures K1=1/R1 and K2=1/R2 are given instead of the principal radii of curvature.) Together with the refractive index n of the glass material, the principal radii of curvature govern the parameters frequently used for an ophthalmologic characterization of a surface:

Surface power=$0.5 \cdot (n-1) \cdot (1/R1 + 1/R2)$

Surface astigmatism=$(n-1) \cdot (1/R1 - 1/R2)$

Surface power D is the parameter via which an increase of power from the distance portion to the near portion is achieved. Surface astigmatism (more clearly termed cylinder power) is a "troublesome property", because an astigmatism—inasmuch as an eye does not have an innate astigmatism to be corrected—that exceeds a value of about 0.5 dpt results in an indistinctly perceived image on the retina.

BACKGROUND OF THE INVENTION

Although any change of the curvature of the surface, as needed to achieve a surface power increase without vision being "disturbed" by surface astigmatism, can be attained relatively simply along a (plane or winding) line, considerable "intersections" of surfaces will result alongside this line, leading to a large surface astigmatism which more or less impairs the lens in regions alongside the mentioned line.

A further consequence of these intersections is that the spectacle lens will have different properties at respective see-through positions on the nasal and temporal side. Binocular vision, in particular, may be adversely affected thereby. This becomes noticeable mainly during movements of glance and is therefore disturbing:

When a spectacles wearer allows his gaze to follow a moving object whilst keeping his head at rest, his visual impression will depend, on the one hand, on the imaging quality of both lenses of his spectacles at the positions he sees through when making the necessary eye movements to follow the object. When the spectacles wearer encounters small image defects (astigmatism, refraction defects, etc.) at these see-through positions, he will see the object more distinctly than when large image defects are present.

On the other hand, however, as a rule both eyes participate in seeing, and the total visual impression will be composed of the visual impressions of both eyes.

Thus, it will be of consequence, for example, whether the object can be binocularly perceived as a single object, how large the effort of fusion is, and whether the spectacles wearer can see the object equally distinctly with both eyes, or well with one eye and badly with the other eye. Finally, in the case of moving objects, any changes of this binocular visual impression whilst the object is being followed will be of importance.

DESCRIPTION OF THE INVENTION

The invention is based on the object of further developing a progressive spectacle lens of the kind set out in the preamble of claim 1 in such manner that the optical parameters that are relevant to the quality of the binocular visual impression will change as little as possible when the glance is being shifted.

The achievement of this object in accordance with the invention is set out in patent claim 1. Further developments of the invention are the subject matter of the dependent claims.

According to the invention it has been realized that the binocular properties that are relevant to an achievement of the set object are the astigmatic difference, the refraction equilibrium, and the vertical prismatic deviation.

These parameters are obtained by computing the principal ray from the centre of rotation of the right eye through a point on the front surface of the right-hand spectacle lens to the object point, and the associated wave front. From the data of this wave front and the prescription for the right eye, the astigmatic deviation and the refraction error are computed in the generally known manner. Subsequently the principal ray and the wave front from the object point through the centre of rotation of the left eye are iterated, assuming intersecting visual axes (orthotropy).

From this, the corresponding see-through points on the right-hand and the left-hand lens have been computed.

The astigmatic deviation and the refraction defect of the wave front through the left-hand spectacle lens are combined with the values for the right-hand lens and thus provide the parameters of astigmatic difference (according to the method of obliquely crossed cylinders) and refraction equilibrium (absolute value of the difference between the mean powers of the spectacle lenses). The vertical prismatic deviation is obtained by projecting the eye-side principal rays onto the Cyclops eye plane and expressing the angle between the straight lines in cm/m.

Of interest for eye movements performed in reading or following moving objects are not only the magnitudes of these parameters, but also their changes during a movement. These changes may be approximately characterized by their "lift", i.e. the difference between the maximum and the minimum values occurring with the movement.

BRIEF DESCRIPTION OF THE DRAWINGS

In the following the invention will be described by way of example, without limitation of the general inventive concept, with the aid of embodiments with reference to the drawings to which attention is expressly drawn concerning the disclosure of all details of the invention not described more explicitly in the text. Shown by FIG. 1 is a comparison of the lifts of astigmatic difference (dpt) occurring with horizontal movements of glance.

DESCRIPTION OF AN EXAMPLE OF EMBODIMENT

Figure 1:
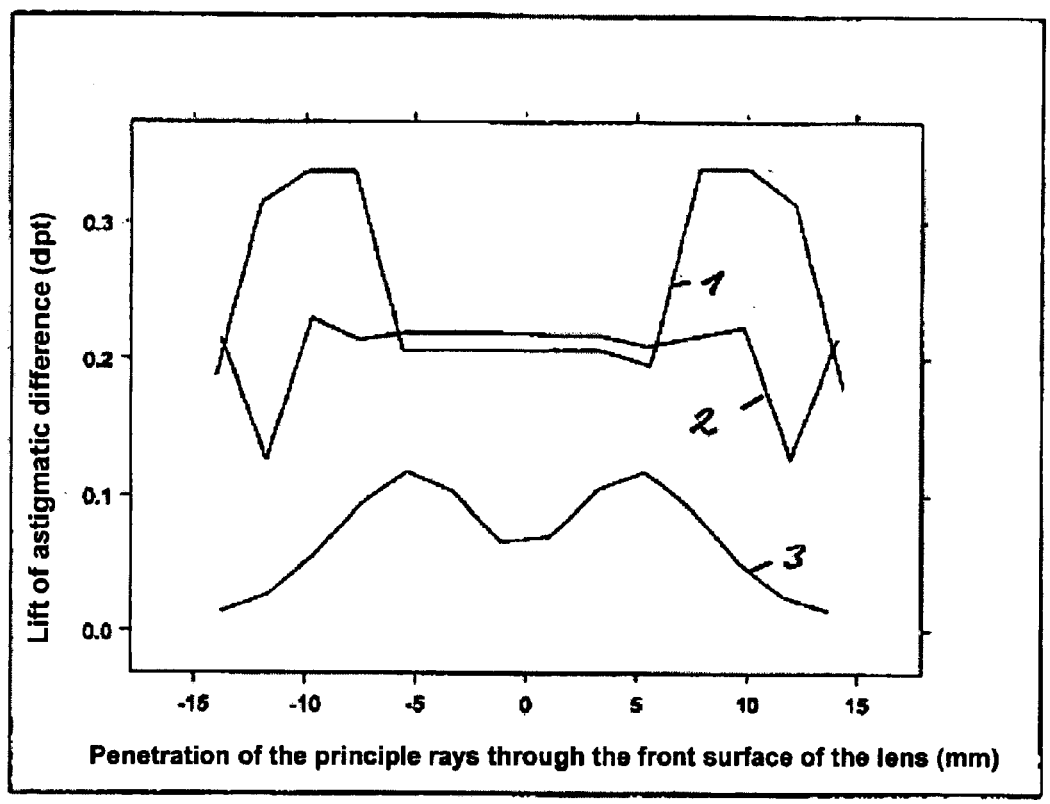
Figure 2:
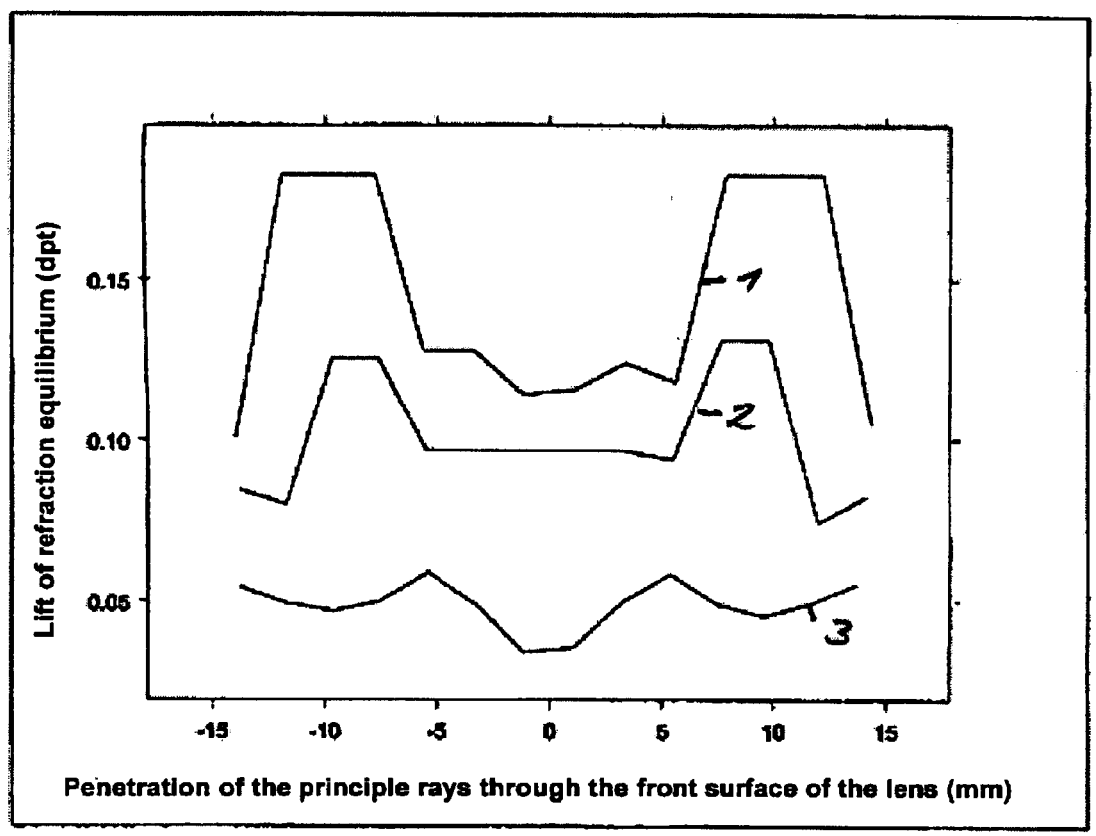
FIG. 2 is a comparison of the lifts of refraction equilibrium (dpt) occurring with horizontal movements of glance.
Figure 3:
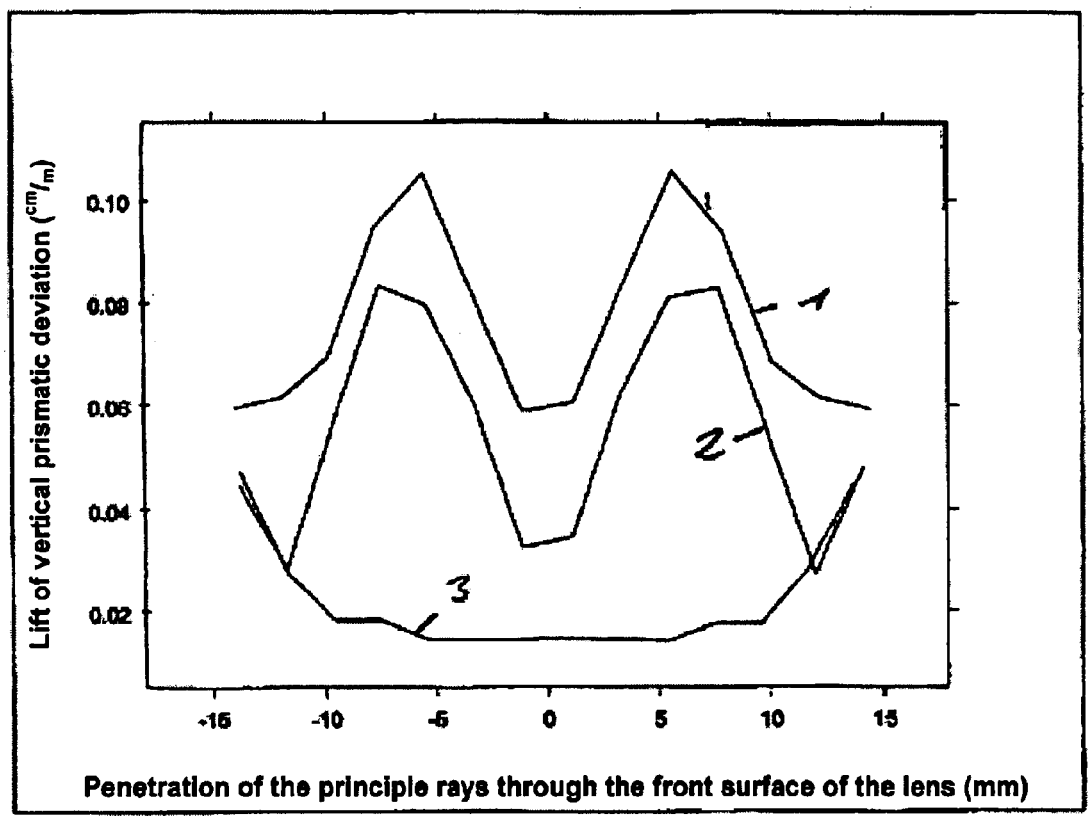
FIG. 3 is a comparison of the lifts of vertical prismatic deviation (cm/m) occurring with horizontal movements of glance.

FIGS. 1 to 3 show the maximum lifts of astigmatic difference, refraction equilibrium and vertical prismatic deviation occurring upon a movement of the eye with each of two right-hand spectacle lenses on the market, namely Varilux Comfort (Curve 1) and GRADAL TOP (Curve 2), each having the prescription sph+0.5 dpt, cyl 0 dpt, Add 2.0 dpt, Pr 0 cm/m, and by way of comparison, with a spectacle lens of the invention (Curve 3) having the same prescription values.

When an object is being followed in a horizontal direction, the (right-hand side) principal rays travel along a total path of 20 mm at a height y=10 mm in the plane z=−40 mm. This corresponds to a height of 4.5 mm on the spectacle lens. The coordinate system used has its origin at the object-side vertex of the spectacle lens, and the z axis extends along the direction of light.

The abscissa values are the arithmetic means of the x coordinates of the first and last points of penetration of the principal rays through the front surface of the lens.

The ordinate values represent the lifts during the described single movements.

The comparison shows that with the subject matter of the invention the lift, being 0.11 dpt at maximum, is distinctly smaller than in prior art.

The lift of the refraction equilibrium (difference of the mean powers of the spectacle lenses) along the entire horizontal meridian is also distinctly less with HEP than with the competition product. Nowhere does it exceed a value of 0.06 dpt.

Distinctly evident is also the smaller change of the lift of the vertical prismatic deviation imaging properties with the subject matter of this invention; the lift does not exceed a value of 0.02 cm/m up to an x coordinate of ±10 mm.

The progressive spectacle lens of the invention is therefore distinct in that the changes of the binocular imaging properties with horizontal movements of glance are as small as possible, and the binocular viewing comfort associated therewith is high.

The progressive spectacle lens of the invention may be computed particularly for the so-called wearing position; for this a situation of (actual) use is established. This relates either to an actual user for whom the individual parameters for the respective situation of use are specially determined and the progressive surface is separately computed and fabricated, or to average values, as described in DIN 58208, Part 2.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. Spectacle lens comprising:

a region (distance portion) designed for viewing at large distances and in particular "to infinity";

a region (near portion) designed for viewing at short distances and in particular "reading distances"; and a progressive zone disposed between the distance portion and the near portion, in which a power of the spectacle lens increases from a value at a distance reference point located in the distance portion to a value at a near reference point located in the near portion along a curve (principal line) veering towards a nose;

wherein, for minimizing a change of binocular imaging properties with horizontal movements of glance, a lift (difference between a maximum and a minimum value occurring during a movement) of binocular imaging properties when a moving object is being followed, is smaller than a physiologically pre-determined limiting amount, wherein a lift of binocular imaging properties that is smaller than a physiologically pre-determined limiting amount is computed for a movement for which intersection points of a principal ray with a plane z=−40 mm at a height of 10 mm are horizontal straight lines having a length of 20 mm.

2. Spectacle lens comprising:

a region (distance portion) designed for viewing at large distances and in particular "to infinity";

a region (near portion) designed for viewing at short distances and in particular "reading distances"; and a progressive zone disposed between the distance portion and the near portion, in which a rower of the spectacle lens increases from a value at a distance reference point located in the distance portion to a value at a near reference point located in the near portion along a curve (principal line) veering towards a nose;

wherein, for minimizing a chance of binocular imagine properties with horizontal movements of glance, a lift (difference between a maximum and a minimum value occurring during a movement) of binocular imaging properties when a moving object is being followed, is smaller than a physiologically pre-determined limiting amount, wherein an absolute value of a difference of minimum and maximum astigmatic difference, occurring during a movement, between a right-hand lens and a left-hand lens at corresponding see-through positions is everywhere less than 0.12 dpt.

3. Spectacle lens comprising:

a region (distance portion) designed for viewing at large distances and in particular "to infinity";

a region (near portion) designed for viewing at short distances and in particular "reading distances"; and a progressive zone disposed between the distance portion and the near portion, in which a power of the spectacle lens increases from a value at a distance reference point located in the distance portion to a value at a near reference point located in the near portion along a curve (principal line) veering towards a nose;

wherein, for minimizing a chance of binocular imaging properties with horizontal movements of glance, a lift (difference between a maximum and a minimum value occurring during a movement) of binocular imaging properties when a moving object is being followed, is smaller than a physiologically pre-determined limiting amount, wherein an absolute value of a difference of minimum and maximum mean powers, occurring during a movement, between a right-hand and a left-hand lens at corresponding see-through positions is everywhere less than 0.06 dpt.

4. Spectacle lens comprising:

a region (distance portion) designed for viewing at large distances and in particular "to infinity";

a region (near portion) designed for viewing at short distances and in particular "reading distances"; and a progressive zone disposed between the distance portion and the near portion, in which a power of the spectacle lens increases from a value at a distance reference point located in the distance portion to a value at a near reference point located in the near portion along a curve (principal line) veering towards a nose;

wherein, for minimizing a change of binocular imaging properties with horizontal movements of glance, a lift (difference between a maximum and a minimum value occurring during a movement) of binocular imaging properties when a moving object is being followed, is smaller than a physiologically pre-determined limiting amount, wherein an absolute value of a difference of minimum and maximum vertical prismatic deviation, occurring during a movement, between a right-hand and a left-hand lens at corresponding see-through positions is everywhere less than 0.05 cm/m.

5. Spectacle lens comprising:

a region (distance portion) designed for viewing at large distances and in particular "to infinity";

a region (near portion) designed for viewing at short distances and in particular "reading distances"; and a progressive zone disposed between the distance portion and the near portion, in which a power of the spectacle lens increases from a value at a distance reference point located in the distance portion to a value at a near reference point located in the near portion along a curve (principal line) veering towards a nose;

wherein, for minimizing a change of binocular imaging properties with horizontal movements of glance, a lift (difference between a maximum and a minimum value occurring during a movement) of binocular imaging properties when a moving object is being followed, is smaller than a physiologically pre-determined limiting amount, wherein an absolute value of a difference of minimum and maximum vertical prismatic deviation, occurring during a movement, between a right-hand and a left-hand lens at corresponding see-through positions for x coordinates between −10 mm and 10 mm is less than 0.02 cm/m.

* * * * *